Figure 1:
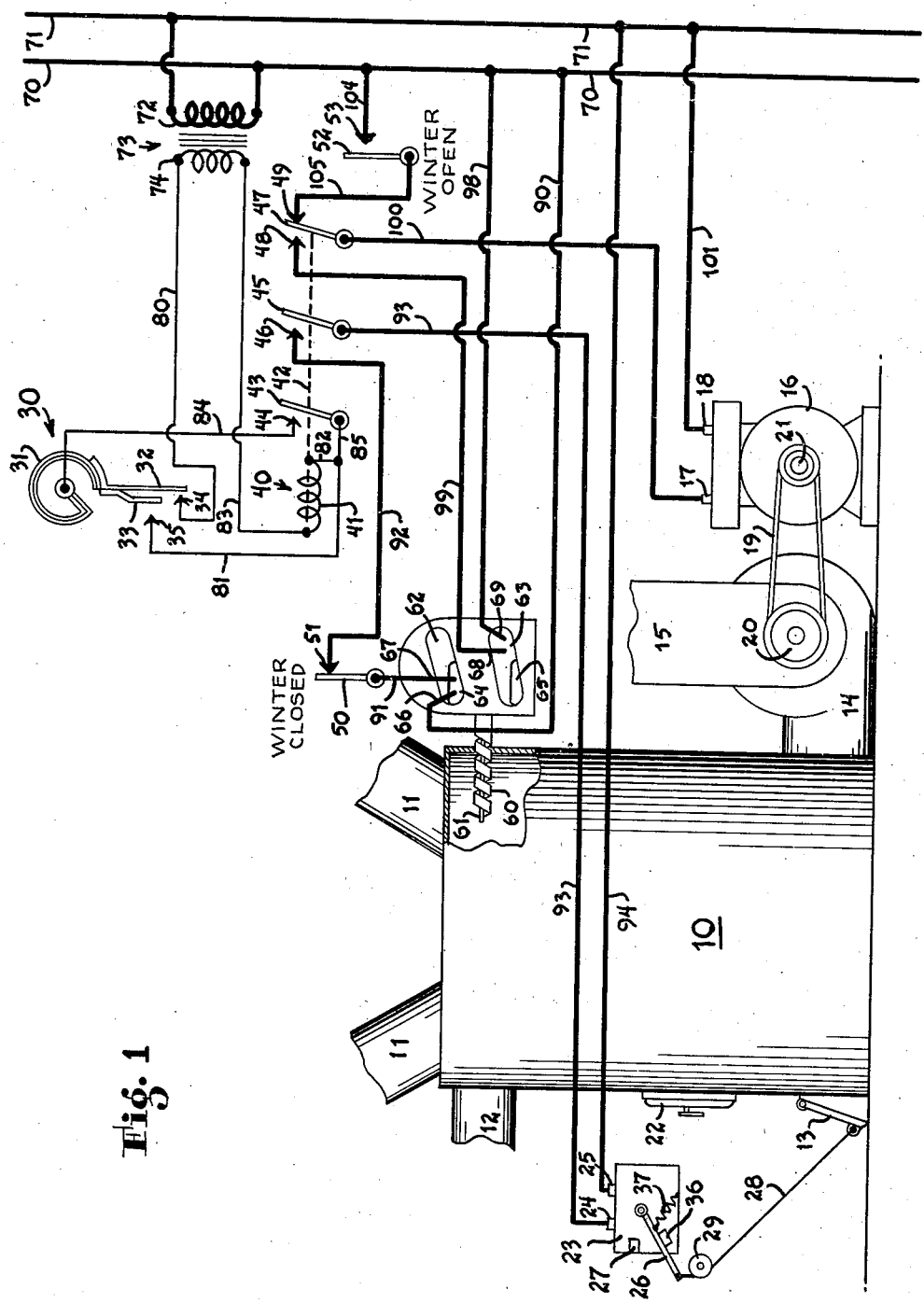

April 8, 1941. G. D. BOWER 2,237,300
AIR CONDITIONING SYSTEM
Filed Aug. 16, 1937 2 Sheets-Sheet 1

INVENTOR
George D. Bower
BY
George H. Fisher
ATTORNEY

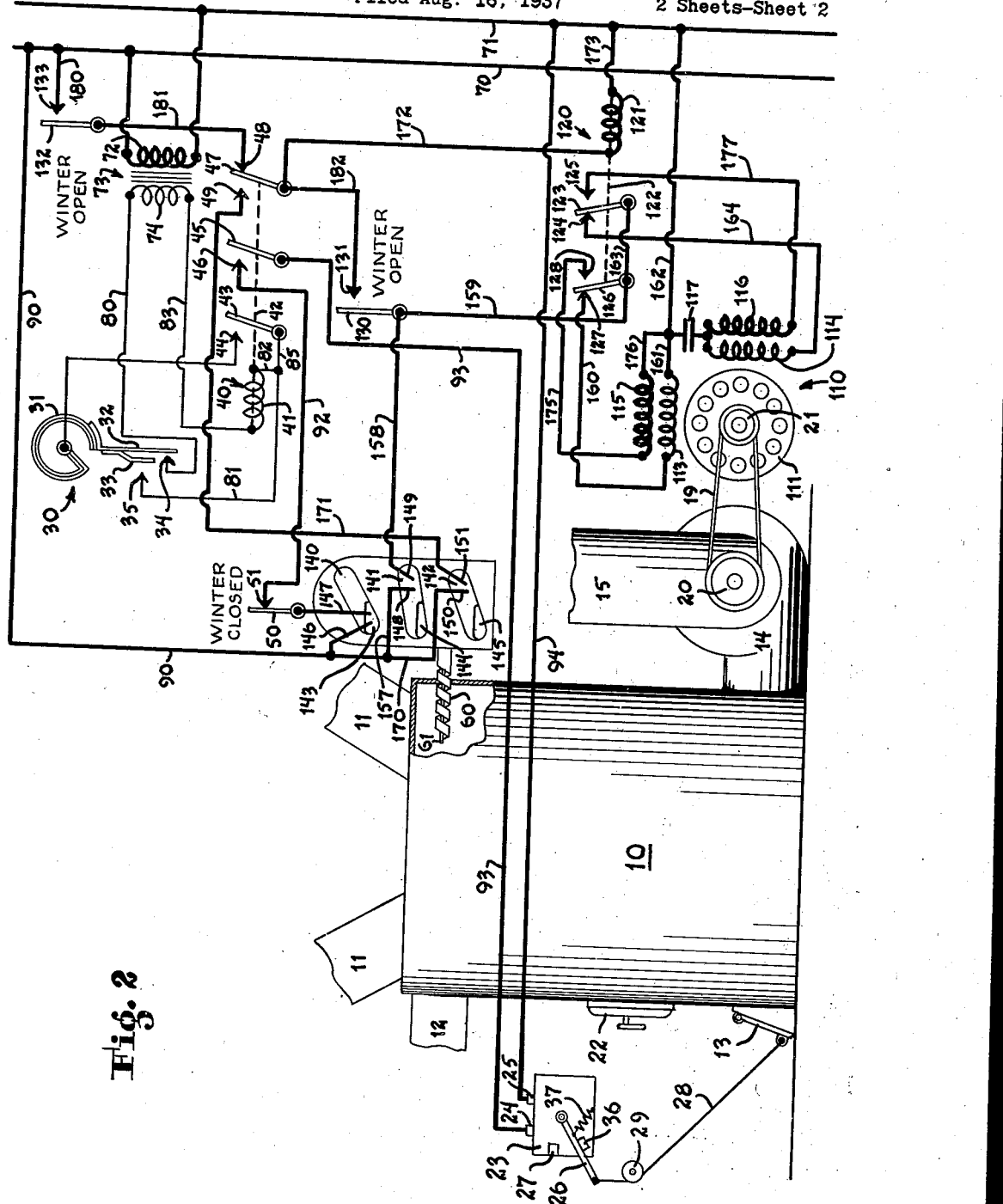

Patented Apr. 8, 1941

2,237,300

UNITED STATES PATENT OFFICE 2,237,300

AIR CONDITIONING SYSTEM

George D. Bower, Columbia Heights, Minn., assignor to Minneapolis-Honeywell Regulator Company, Minneapolis, Minn., a corporation of Delaware Application August 16, 1937, Serial No. 159,309

10 Claims. (Cl. 236—9)

This invention relates to an air conditioning system, and more particularly to a system in which heated air or unheated air may be circulated through a space as conditions in said space require. Thus, in the winter time, heated air is circulated through a space when the temperature in the space falls below a predetermined value, whereas in the summer time it may be desirable to circulate unheated air through the space when the temperature rises above a predetermined value. In such systems, the air circulating means is preferably under the control of a temperature responsive device in the furnace or heater when heated air is desired to be circulated, so that when heat is desired in the space, the air circulating means will not be operated until the temperature of the heater reaches a certain value. It is desirable, when unheated air is to be circulated upon the attainment of a predetermined temperature in the space, to have the air circulating means operate independently of the temperature responsive means in the heater, so that no adjustment of this means is necessary.

It is therefore an object of my invention to provide an improved air circulating system for circulating heated or unheated air through a space as conditions require.

More specifically, it is an object of my invention to provide an air circulating system for automatically operating a fan to supply heat to a space to maintain a predetermined temperature in the space during cold weather, the air circulating means being under the control of a temperature responsive device in the air heater, and during hot weather, to circulate unheated air through the space when the temperature reaches a predetermined value, the circulating means in this latter operation being independent of the temperature responsive device in the air heater.

Another object of my invention is to provide a summer-winter air circulating system, wherein a fan is operated in hot weather to circulate unheated air through a space whenever the temperature in the space reaches a certain value, and wherein, should the temperature in a heater rise to a certain high value for any reason during the summer, as when trash is burned therein, the fan will be operated to dissipate the heat from the heater thereby preventing the attainment of excessive temperatures in the heater.

A further object is to provide an air circulating system wherein, in cold weather, a heater and a fan are under the control of a space thermostat, the fan being also under the control of a thermostat in the heater, and wherein, in hot weather, the heat changing means may be removed from the control of the space thermostat and the fan may be automatically operated to supply unheated air to the space in response to the attainment of a predetermined temperature in the space, the fan during this time being operated independently of the thermostat in the heater.

A further object is to provide an air circulating system wherein a two-speed fan is operated to circulate air through a heater and a space to be heated in cold weather, wherein the fan runs at low or high speed depending on the temperatures existing in the heater and the space, the heater being under the control of a space thermostat, and in which the fan is run at high speed in summer when the temperature of the space reaches a predetermined value, the fan operation being independent of the temperature of the heater, the heater being rendered inoperative.

Further objects will become apparent upon a study of the specification, claims and appended drawings, in which similar reference characters represent similar parts in the two figures, and in which Figure 1 is a view of my air circulating system in which a single speed fan is provided, and Figure 2 shows a view of my system utilizing a two-speed fan.

In Figure 1 I have shown a conventional warm air furnace represented by the reference character 10, said furnace having warm air ducts 11, a stack 12, a draft damper 13, a blower 14, and a firing door 22.

A return air pipe 15 supplies air to the blower 14, said blower being driven by a motor 16 having terminals 17 and 18, said motor being connected to the blower by means of a belt 19 passing over pulleys 20 and 21 of the fan and motor, respectively.

For operating damper 13, a damper motor 23 having terminals 24 and 25 is provided. An arm 26 is caused to move upwardly against a stop 27 when the motor is energized, this arm being connected to damper 13 by means of a cable 28 passing over a pulley 29, whereby the damper 13 is caused to open and remains open as long as the damper motor is energized. When the motor is deenergized, the weight of damper 13 will cause arm 26 to move against stop 36 in which position the damper is closed. A spring 37 may be provided to assure the return of arm 26 to the damper closing position.

Mounted in a space to be conditioned is a thermostat generally indicated by reference character 30. This thermostat comprises a bimetallic element 31 to which are connected blades 32 and 33 to be moved thereby in response to temperature changes in the space. Cooperating with blades 32 and 33 are fixed contacts 34 and 35, contact 34 being positioned closer to blade 32 than is contact 35 with respect to blade 33. Blade 32 is made flexible, the arrangement being such that when the temperature drops to a certain value, blade 32 will engage contact 34 and when the temperature drops to a slightly lower value blade 33 will engage contact 35.

For controlling the operation of the blower 14 and the damper motor 23, I have provided a relay generally indicated by the reference character 40. This relay comprises a coil 41, an armature 42, a switch blade 43 cooperating with a fixed contact 44, a switch blade 45 cooperating with fixed contact 46 and a switch blade 47 cooperating with contacts 48 and 49. When the relay is deenergized, blades 43, 45, and 47 are out of engagement with contacts 44, 46, and 48, respectively, and blade 47 is in engagement with contact 49, and upon energization of coil 41, the switch blades 43, 45, and 47 are all moved into engagement with contacts 44, 46, and 48, respectively.

Mounted in the heating chamber of furnace 10 is a bimetallic element 60 connected at one end with a rod 61, said rod being connected with mercury switches 62 and 63 to tilt the same in response to temperature changes in the heating chamber in a well known manner. Mercury switches 62 and 63 are provided with mercury elements 64 and 65. Switch 62 is provided with contacts 66 and 67 which are normally closed by the mercury element 64, said switch being tilted in response to the attainment of a predetermined high temperature in the heating chamber to open contacts 66 and 67. Switch 63 is provided with contacts 68 and 69, these contacts being normally open and being closed by the mercury element 65 when said switch is tilted in response to the attainment of a predetermined high temperature, the temperature necessary to tilt switch 63 to closed position being less than that necessary to tilt switch 62 to open position.

A switch blade 50 is arranged to engage a contact 51 and a switch blade 52 is arranged to engage a contact 53, these switches being arranged for manual operation. In practice, these switches will be grouped together and operated simultaneously by a single actuator.

Lines 70 and 71 are connected to a suitable source of power (not illustrated) and across these lines is connected a high tension coil 72 of a transformer 73, said transformer having a low tension coil 74 as illustrated.

*Operation of species of Figure 1*

With the parts in the position illustrated, manual switch 50 is in engagement with contact 51 and switch 52 is out of engagement with contact 53, these being the positions of the switches for winter operation. Blades 32 and 33 of thermostat 30 are out of engagement with contacts 34 and 35, respectively, the temperature in the space in which thermostat 30 is located being sufficiently high so that no heat is required in the space. No current is flowing through motor 16 or motor 23, so that minimum heat is being supplied to the heating chamber and no air is being circulated by blower 14 in the space to be heated.

Assume that the temperature in the space to be heated falls to a point where blade 32 of thermostat 30 engages contact 34. No circuit is closed by this action of the thermostat. If the temperature drops to a value slightly lower than that required to cause thermostat blade 32 to engage contact 34, two degrees for example, the blade 33 of thermostat 30 will engage contact 35 thus energizing a circuit through relay coil 41, which circuit is as follows: from the low tension coil 74 of transformer 73 through conductor 80, contact 34, thermostat blades 32 and 33, contact 35, conductors 81 and 82, coil 41, and conductor 83 back to the other side of the low tension coil 74. Energization of coil 41 causes switch blades 43, 45, and 47 to engage contacts 44, 46, and 48, respectively. Engagement of switch blade 43 with contact 44 closes a holding circuit through the relay 40 whereupon relay coil 41 will remain energized until both thermostat blades 32 and 33 have moved away from their respective contacts. It will therefore be seen that relay coil 41 is energized at a temperature slightly lower than that at which it is deenergized. This holding circuit for coil 41 is as follows: from low tension coil 74 through conductor 80, contact 34, thermostat blade 32, bimetallic element 31, conductor 84, contact 44, switch blade 43, conductors 85, 82, relay coil 41 and conductor 83 to the other side of low tension coil 74.

Movement of switch blade 45 into engagement with contact 46 by the energization of coil 41 closes a circuit through damper motor 23, this circuit being as follows: from the line 70, through conductor 90, contacts 66 and 67 which are closed by the mercury element 64, switch 50, contact 51, conductor 92, contact 46, switch blade 45, conductor 93, terminal 24 of motor 23, through the motor to terminal 25 and through conductor 94 to the line 71. Energization of motor 23 causes damper 13 to be opened as previously described and the temperature in the heating chamber starts to rise.

When the temperature rises to a point wherein bimetallic element 60 causes switch 63 to be tilted to a position wherein mercury element 65 closes contacts 68 and 69, a circuit through fan motor 16 is energized, this circuit being as follows: from the line 70 through conductor 98, contacts 69 and 68, conductor 99, contact 48, switch blade 47, conductor 100, terminal 17 through the motor to terminal 18 and conductor 101 to the line 71. The motor now causes operation of blower 14 whereupon the air is circulated through the heating chamber of furnace 10, warm air ducts 11 through the space or spaces to be heated and back to the blower 14 through the return air duct 15. When the temperature in the space in which thermostat 30 is located, rises to a predetermined value, thermostat blades 32 and 33 are moved out of engagement with their respective contacts 34 and 35, thus causing the circuit through relay coil 41 to be broken, whereupon blades 43, 45, and 47 move back to their original positions, thus causing motor 16 and motor 23 to be deenergized whereupon the draft to the furnace is cut off and blower 14 comes to rest. This cycle of operation will of course be repeated whenever the temperature in the space in which the thermostat is located again drops to a value wherein blades 32 and 33 of thermostat 30 engage contacts 34 and 35. Switch 62 will be tilted to a position wherein contacts 66 and 67 are open, should the temperature of the heating chamber rise to a predetermined high value, thus breaking the circuit to motor 23, whereupon damper 13 closes, thereby preventing the attainment of an excessive temperature in the heating chamber.

It is desired to circulate unheated air through the space in hot weather as in the summer time, switch 50 will be moved out of engagement with contact 51 and switch 52 will simultaneously be moved into engagement with contact 53. The moving away of switch 50 from engagement with contact 51 opens the circuit through motor 23 so that the said motor is never energized regardless of the temperature in the space. With switch blade 52 in engagement with contact 53 and relay coil 41 deenergized by reason of the fact that the temperature in the space is at a value higher than that required to cause blades 32 and 33 of thermostat 31 to engage their respective contacts 34 and 35, current will flow through the motor 16 as follows: from the line 70 through conductor 104, contact 53, switch blade 52, conductor 105, contact 49, switch blade 47, conductor 100, terminal 17 of motor 16 through the motor to terminal 18 and conductor 101 to line 71. It should be noted that this circuit through the motor is independent of the mercury switch 63 so that the operation of the motor when the temperature in the space is above a predetermined value is not dependent upon the closing of contacts 68 and 69 of said switch 63.

Should the temperature in the space now drop to a point where thermostat blades 32 and 33 are moved into engagement with contacts 34 and 35 by reason of the circulation of unheated air through the space, relay coil 41 will be energized through the same circuit as that previously described. Energization of relay coil 41 now causes blade 47 to move out of engagement with contact 49 and into engagement with contact 48. Since switch 63 will normally be tilted to open position when the heating chamber of furnace 10 is unheated both of the previously described circuits through motor 16 are open and blower 14 is at rest. Blower 14 will not again be operated until the temperature in the space rises to a point wherein the blades 32 and 33 of the thermostat move out of engagement with contacts 34 and 35, thus deenergizing relay coil 41 and allowing switch blade 47 to move into engagement with contact 49.

Should trash be thrown in the furnace 10 for the purpose of burning it up or for the purpose of temporarily supplying some heat to the space during an unseasonable cold spell during the summer, the temperature in the heating chamber of the furnace will rise, and if it rises to a high enough value, switch 63 will be tilted to a position wherein mercury element 65 closes contacts 68 and 69. Thus with the thermostat in the position with blades 32 and 33 in engagement with contacts 34 and 35, while the regular summer circuit through the motor 16 will be broken by reason of relay coil 40 becoming energized and causing switch blade 47 to move out of engagement with contact 49, a circuit through the motor 16 will be established through the switch 63, this circuit being the same as that described in connection with the winter operation of the circuit, it being understood, of course, that switch blade 47 has moved into engagement with contact 48.

It is thus seen that with the system just described the operation of the blower in the winter time is dependent upon the attainment of a certain temperature in the heating chamber of the furnace 10 but in the summer operation of the system the motor 16 is caused to operate when the temperature in the space reaches a certain high value, through a circuit which is entirely independent of the switch responsive to the temperature of the heating chamber of the furnace, but the motor may be operated with the parts in summer position when the temperature of the space has fallen below the predetermined temperature should the temperature of the heating chamber of the furnace be raised in any manner such as by the burning of trash therein. Thus is will be seen that in the summer time motor 16 will operate if the temperature in the heating chamber is above a predetermined value, regardless of the temperature in the space, and this is desirable to prevent the attainment of an excessive high temperature in the heating chamber.

*Description of Figure 2*

In the form of invention shown in Figure 2 a warm air furnace similar to that shown in Figure 1 is provided. A two-speed motor 110 is provided in this instance for operating blower 14, this motor being of the split phase induction type and comprises an armature 111, low speed field windings 113 and 114, and high speed windings 115 and 116. Windings 114 and 116 are connected together at one end, this end being connected to line 71 through a condenser 117, whereas windings 113 and 115 are directly connected to the line 71 at one end thereof.

For changing the flow of current from the low to the high speed windings and vice versa, a relay generally indicated by the reference character 120 is provided. This relay comprises a coil 121, an armature 122 to which are connected switch blades 123 and 126, switch blade 123 being arranged to cooperate with fixed contacts 124 and 125 and switch blade 126 being arranged to cooperate with fixed contacts 127 and 128. When the relay coil 121 is deenergized the blades 123 and 126 are in the positions shown, in engagement with contacts 124 and 127 and when said coil is energized the switch blades are moved into engagement with contacts 125 and 128.

The bimetallic element 60 controls the operation of three mercury switches designated by reference characters 140, 141, and 142 having mercury elements 143, 144, and 145, respectively. Switch 140 is provided with fixed contacts 146 and 147, switch 141 is provided with fixed contacts 148 and 149 and switch 142 is provided with fixed contacts 150 and 151. Contacts 146 and 147 of switch 140 are normally closed whereas the contacts of the other two switches are normally open. The switches are so arranged that when the temperature in the chamber of said furnace 10 reaches one value contacts 148 and 149 of switch 141 are closed, when the temperature rises to a certain higher value contacts 150 and 151 of switch 142 are closed and if the temperature rises to a still further high value, contacts 146 and 147 of switch 140 are opened.

A switch 50 cooperates with a contact 51 as in the system shown in Figure 1. Switch blades 130 and 132 are also provided, these switches cooperating with contacts 131 and 133, respectively, these switches being all manually operated. These switches will in practice be grouped together and actuated simultaneously by a single operator.

*Operation*

With the parts in the position illustrated the system is set for winter operation. Switch blade 50 is in engagement with contact 51, and switch blades 130 and 132 are out of engagement with their respective contacts 131 and 133. The thermostat 30 is satisfied, that is, it is not calling for any heat, damper 13 is closed and motor 110 is deenergized. When heat is required in the space surrounding the thermostat 30, blades 32 and 33 move into engagement with contacts 34 and 35 thereby energizing relay coil 41 in the same way as in Figure 1. Switch blades 43, 45, and 47 are all moved into engagement with their respective contacts 44, 46, and 49, the movement of switch blade 43 into engagement with contact 44 closing a holding circuit through the relay coil 41 which is independent of thermostat blade 33 as described in connection with Figure 1. Movement of switch blade 45 into engagement with contact 46 causes damper motor 23 to be energized as previously described whereupon the temperature in the heating chamber of furnace 10 commences to rise.

After the temperature has risen to a point in which mercury switch 141 has been tilted to close contacts 148 and 149, a low speed circuit through motor 110 is energized, this circuit being as follows: from line 70 through conductors 90, 157, contact 148, mercury element 144, contact 149, conductors 158 and 159 to the switch blade 126 and through conductor 163 to blade 123. From switch 126 current flows through winding 113 as follows: contact 127, through conductor 160, winding 113, conductors 161 and 162 to the line 71. Current also flows through winding 114 as follows: from the switch blade 123, contact 124, conductor 164 through winding 114, condenser 117, and conductor 162 to the line 71. The motor 114 now starts operating at low speed to circulate air through the heating chamber of the furnace 10 and the space or spaces to be heated at a low rate of flow.

If the temperature of the heating chamber continues to rise before thermostat 30 is satisfied, to a higher predetermined value, switch 142 will be tilted to cause mercury element 145 to close contacts 150 and 151. This causes a flow of current through relay coil 121 as follows: from line 70, conductors 90, 170, contact 150, mercury element 145, contact 151, conductor 171, contact 49, switch blade 47, conductor 172, and coil 121 through conductor 173 to the line 71. Energization of coil 121 causes switch blades 123 and 126 to be moved into engagement with contacts 125 and 128, respectively. Current now flows to the switch blades from line 70, through conductors 90, 157, contact 148, mercury element 144, contact 149, conductors 158, 159, and through switch blade 126, contact 128, conductor 175, high speed winding 115, conductors 176 and 162 to the line 71. Current also flows from conductor 159 through conductor 163, switch blade 123 through contact 125, conductor 177 through the high speed winding 116, condenser 117 and the conductor 162 to the line 71. It is therefore seen that with switch blades 123 and 126 in engagement with contacts 125 and 128 current flows through the high speed motor windings whereupon the fan is rotated at high speed and causes circulation of air through the system at a high rate of flow.

Should the temperature of the heating chamber rise to a value wherein switch 140 is opened before the space thermostat 30 is satisfied the circuit through motor 23 wil be broken whereupon the temperature in the heating chamber will start to fall.

Assume that this temperature has not been reached but that thermostat 30 is satisfied, that is blades 32 and 33 have moved out of engagement with contacts 34 and 35, relay coil 41 is deenergized and the switch blades 43, 45, and 47 move into the positions illustrated. The moving of switch blade 45 out of engagement with contact 46 causes motor 23 to be deenergized whereupon the temperature of the heating chamber starts to drop. The moving of switch blade 47 out of engagement with contact 49 opens the above described circuit through the relay coil 121 whereupon switch blades 126 and 123 are moved back to their original positions, the high speed circuit through the motor is broken and the low speed circuit through the motor is reenergized, this low speed circuit being independent of relay coil 41 but dependent solely on closing of contacts 148 and 149 of switch 141. When the temperature in the heating chamber drops to a value in which this switch 141 is tilted back to open position the circuit through the motor 110 is interrupted and the motor and blower come to rest. The above described cycle of operation will be repeated when there is again a call for heat by thermostat 30.

If it is desired to change the system to summer operation to circulate unheated air through the space, switch blade 50 is moved out of engagement with contact 51 thus preventing any circuit from being established through motor 23 and thereby preventing energization of said motor during summer operation. Switch blades 130 and 132 are simultaneously moved into engagement with contacts 131 and 133. If thermostat 31 is in the position illustrated the temperature in the space is higher than that desired and unheated air will be circulated through the system. A circuit through relay coil 121 is energized as follows: from the line 70 through conductor 180, contact 133, switch blade 132, conductor 181, contact 48, switch blade 47, conductor 172, relay coil 121, and conductor 173 to the line 71. Switch blades 123 and 126 are accordingly moved into engagement with contacts 125 and 128 which it will be recalled is the high speed position for the motor. A circuit through the motor is established as follows: from line 71 through conductor 180, contact 133, switch blade 132, conductor 181, contact 48, switch blade 47, conductor 182, contact 131, switch blade 130, conductor 159 to the switch blades 126 and 123, from switch blade 126, contact 128, through conductor 175, high speed winding 115, and conductors 176 and 162 to the line 71. Current also flows from switch blade 123 through contact 125, conductor 177 through the high speed winding 116, condenser 117 and conductor 162 to the line 71. Motor 110 now operates at high speed which causes circulation of unheated air through the system at a high rate of flow until bimetallic element 31 of thermostat 30 moves blades 32 and 33 to a position in which there is a call for heat or call for shut down of the circulation of unheated air, in which position they are in engagement with contacts 34 and 35, respectively. Moving of the blades 32 and 33 in engagement with contacts 34 and 35 causes current to flow through relay coil 41 as previously described and causes switch blade 47 to move into engagement with contact 49. Since the current through the motor flows through contact 48 and switch blade 47 in the summer operation it will be apparent that the moving of blade 47 from contact 48 opens this circuit through the motor.

Should the furnace be heated up for any reason as the burning of trash therein in the summer time, and the temperature in the heating chamber rise to a value wherein switch 141 is tilted to closed position the low speed motor circuit through this switch will be closed, this circuit being the same as that described in connection with the winter operation. It is therefore apparent that if the temperature in the heating chamber for any reason is raised to a certain high value, motor 110 will be caused to operate regardless of the temperature surrounding thermostat 30, in the summer operation of the system.

It is thus seen that in the form of invention disclosed in Figure 2 I have provided a two-speed fan operation for winter time and means whereby the fan is operated at high speed in the summer when the cooling effect of unheated air is desirable, the operation of the fan in the summer time being entirely independent of the temperature in the heating chamber in normal operation, but in which, should the temperature of the heating chamber be raised to a certain predetermined value, the fan will be operated to dissipate the heat in the furnace.

Having described the preferred embodiments of my invention it will be understood that it is capable of many modifications by those skilled in the art and I wish it to be understood that my invention is limited only by the scope of the appended claims.

I claim as my invention:

1. In a system of the class described, a heating chamber, means for increasing the heating effect of said chamber, air circulating means for circulating air through said chamber and through a space to be heated, temperature responsive means in said space, said temperature responsive means including a contact member movable in response to temperature changes in said space and fixed contact means cooperating therewith, said movable contact member and fixed contact means being arranged to engage one another upon the attainment of a predetermined low temperature in said space, a relay, means causing energization of said relay in response to engagement of said movable contact member and fixed contact means with one another, switching means having two positions, means causing operation of said air circulating means in response to energization of said relay and the attainment of a high predetermined temperature in said chamber in one position of said switching means, means causing operation of said air circulating means when said relay is deenergized, regardless of the temperature of the heating chamber when the switching means is in a second position, and means independent of said relay for causing operation of said air circulating means upon the attainment of a high predetermined temperature in the heating chamber when the switching means is in the second position.

2. In an all year air conditioning control system, in combination, heating means, means comprising a fan for circulating air from said heating means to a space to be heated, a thermostat in said space, a relay controlled by said thermostat, switching means responsive to heat generated at said heating means, means whereby said fan may be operated at variable speeds comprising electrical circuits controlled by said switching means, one of said circuits controlling relatively high speed operation of said fan and said one circuit being controlled by said relay in a manner whereby it can only be completed to cause fan operation at relatively high speed when said thermostat is calling for heat, another of said circuits being such that it can be completed for fan operation at relatively low speed irrespective of the position of said relay, whereby upon said thermostat becoming satisfied said fan will drop to relatively low speed, and said switching means can cause fan operation at relatively low speed in response to heat at said heating means independently of thermostatic demands.

3. In an all year air conditioning control system, in combination, heating means, means comprising a fan for circulating air from said heating means to a space to be heated, a thermostat in said space, a relay controlled by said thermostat, switching means responsive to heat generated at said heating means, means whereby said fan may be operated at variable speeds comprising electrical circuits controlled by said switching means, one of said circuits controlling relatively high speed operation of said fan and said one circuit being controlled by said relay in a manner whereby it can only be completed to cause fan operation at relatively high speed when said thermostat is calling for heat, another of said circuits being such that it can be completed for fan operation at relatively low speed irrespective of the position of said relay, summer-winter switch means controlling electrical circuits whereby said relay relinquishes control of said heating means and whereby circuits are completed for operating said fan at relatively high speed whenever said relay is in a position indicating a demand for less heat at said thermostat.

4. In an all year air conditioning control system, in combination, heating means, means comprising a fan for circulating air from said heating means to a space to be heated, a thermostat in said space, a relay controlled by said thermostat, said relay having in and out positions and becoming energized at a predetermined temperature affecting said thermostat, switching means responsive to heat generated at said heating means, means whereby said fan may be operated at variable speeds comprising electrical circuits controlled by said switching means, one of said circuits controlling relatively high speed fan operation and another controlling relatively low speed fan operation, said switching means causing said fan to start after said relay has been operated in response to a demand for heat at said thermostat, and to thereafter automatically increase the speed of said fan, summer-winter switching means controlling electrical circuits so arranged that when said last means are in summer position circuits are completed for immediately causing high speed fan operation whenever said relay is in position indicating a demand for less heat at said thermostat, and said thermostat controlling operation of the relay in the same manner in summer as in winter.

5. In an all year air conditioning control system, in combination, heating means, means for circulating air from the heating means to a space to be heated, control apparatus comprising a space thermostat having contacts which close at a predetermined temperature, a relay controlled by said thermostat and energizable when said contacts close, summer-winter switching means having summer and winter positions and controlling electrical circuits so arranged that in winter position of the switching means the relay controls the heating means and brings about increased air circulation when the relay is in one position, said switching means when in summer position causing said relay to relinquish control of said heating means, said contacts of said thermostat controlling said relay in the same manner in summer as in winter, said relay causing air circulation by said air circulating means when said relay is in its opposite position during summer operation, and means responsive to the temperature of the heating means operable to control the circulating means independently of the space thermostat and relay.

6. In an all year air conditioning control system, in combination, heating means, means for circulating air from the heating means to a space to be heated, control apparatus comprising a space thermostat having contacts which close at a predetermined temperature, a relay controlled by said thermostat and energizable when said contacts close, electrical circuit means controlling said heating means and air circulating means, summer-winter switching means having summer and winter positions controlling said circuit means, said relay when in one position controlling said circuit means to control the heating means providing said summer-winter switching means is in winter position and said relay when in said one position controlling said circuit means to control the air circulating means, said summer-winter switching means when in summer position affecting said circuit means to interrupt control of the heating means by said relay, said contacts of said thermostat controlling said relay in the same manner in summer as in winter, and circuit means controlled by said relay and said summer-winter switching means so arranged that when the summer-winter switching means is in summer position the relay controls the air circulating means to cause air circulation when the relay is in the opposite position.

7. In an all year air conditioning control system, in combination, heating means, means for circulating air from the heating means to a space to be heated, control apparatus comprising a space thermostat having contacts which close at a predetermined temperature, and a device responsive to the temperature of the heating means, a relay controlled by said thermostat and energizable when said contacts close, summer-winter switching means having summer and winter positions, electrical circuit means controlling said heating means and air circulating means, said summer-winter switching means controlling said circuit means and said device controlling said circuit means to control the heating means, said relay when in one position controlling said circuit means to control the heating means providing said summer-winter switching means is in winter position and dependently on said device, and said relay when in said one position controlling said circuit means to control the air circulating means, said summer-winter switching means when in summer position affecting said circuit means to interrupt control of the heating means by said relay, said contacts of said thermostat controlling said relay in the same manner in summer as in winter, and circuit means controlled by said relay and said summer-winter switching means so arranged that when the summer-winter switching means is in summer position the relay controls the air circulating means to cause air circulation when the relay is in the opposite position.

8. In an all year air conditioning control system, in combination, heating means, means for circulating air from the heating means to a space to be heated, control apparatus comprising a space thermostat having contacts which close at a predetermined temperature, a relay controlled by said thermostat and energizable when said contacts close, electrical circuit means controlling said heating means and air circulating means, summer-winter switching means having summer and winter positions controlling said circuit means, said relay when in one position controlling said circuit means to control the heating means providing said summer-winter switching means is in winter position and said relay when in said one position controlling said circuit means to control the air circulating means, said summer-winter switching means when in summer position affecting said circuit means to interrupt control of the heating means by said relay, said contacts of said thermostat controlling said relay in the same manner in summer as in winter, circuit means controlled by said relay and said summer-winter switching means so arranged that when the summer-winter switching means is in summer position the relay controls the air circulating means to cause air circulation when the relay is in the opposite position, and means responsive to the temperature of the heating means controlling said circuit means to cause circulation of air by said air circulating means in response to heat at said heating means irrespective of the position of said relay.

9. In all year air conditioning control system, in combination, heating means, means comprising a fan for circulating air from said heating means to a space to be heated, a thermostat in said space, a relay controlled by said thermostat, switching means responsive to heat generated at said heating means, means whereby said fan may be operated at variable speeds comprising electrical circuits controlled by said switching means, one of said circuits controlling relatively high speed fan operation and another controlling relatively low speed fan operation, connections whereby said relay normally controls said high speed circuit, connections whereby said switching means normally controls said low speed circuit independently of said relay, and means comprising a summer-winter switch and connections whereby when said switch is in one position said switching means controls said high speed circuit independently of said relay.

10. In an all year air conditioning control system, in combination, heating means, means comprising a fan for circulating air from said heating means to a space to be heated, a thermostat in said space, a relay controlled by said thermostat, switching means responsive to heat generated at said heating means, means whereby said fan may be operated at variable speeds comprising electrical circuits controlled by said switching means, one of said circuits controlling relatively high speed fan operation and another controlling relatively low speed fan operation, connections whereby said relay normally energizes said high speed circuit when in one position, connections whereby said switching means normally controls said high speed circuit, and said low speed circuit independently of the relay, means comprising a summer-winter switch and connections whereby when said last means is in one position said relay energizes said high speed circuit when in the opposite position independently of said switching means and said switching means controls said high speed circuit independently of said relay.

GEORGE D. BOWER.